US008165942B1

(12) United States Patent
Rordorf

(10) Patent No.: US 8,165,942 B1
(45) Date of Patent: Apr. 24, 2012

(54) SYSTEM AND METHOD FOR CALCULATING A FINANCIAL MARKET INDEX

(75) Inventor: Corentin Rordorf, New York, NY (US)

(73) Assignee: Morgan Stanley, New York, NY (US)

( * ) Notice: Subject to any disclaimer, the term of this patent is extended or adjusted under 35 U.S.C. 154(b) by 410 days.

(21) Appl. No.: 12/480,979

(22) Filed: Jun. 9, 2009

(51) Int. Cl.
*G06Q 40/00* (2006.01)
(52) U.S. Cl. .................................. 705/35; 705/36 R
(58) Field of Classification Search .................. 705/35, 705/36 R
See application file for complete search history.

(56) References Cited

U.S. PATENT DOCUMENTS

| 2006/0265302 A1* | 11/2006 | Schmalenberger et al. ..... 705/35 |
| 2009/0287611 A1* | 11/2009 | Jeng ............................. 705/36 R |
| 2010/0030799 A1* | 2/2010 | Parker et al. .................. 707/102 |

\* cited by examiner

*Primary Examiner* — Olabode Akintola

(57) ABSTRACT

Systems and methods of generating a financial market index are disclosed. According to various embodiments, the index may use a fundamental economic indicator to determine a leverage factor. In various embodiments, the leverage factor is increased if the 3M USD LIBOR increases by at least ten basis points during a determined time period, otherwise the leverage factor is decreased. The leverage factor may have upper and lower bounds. The index level may be calculated daily, with the rebalancing occurring on a monthly cycle.

20 Claims, 3 Drawing Sheets

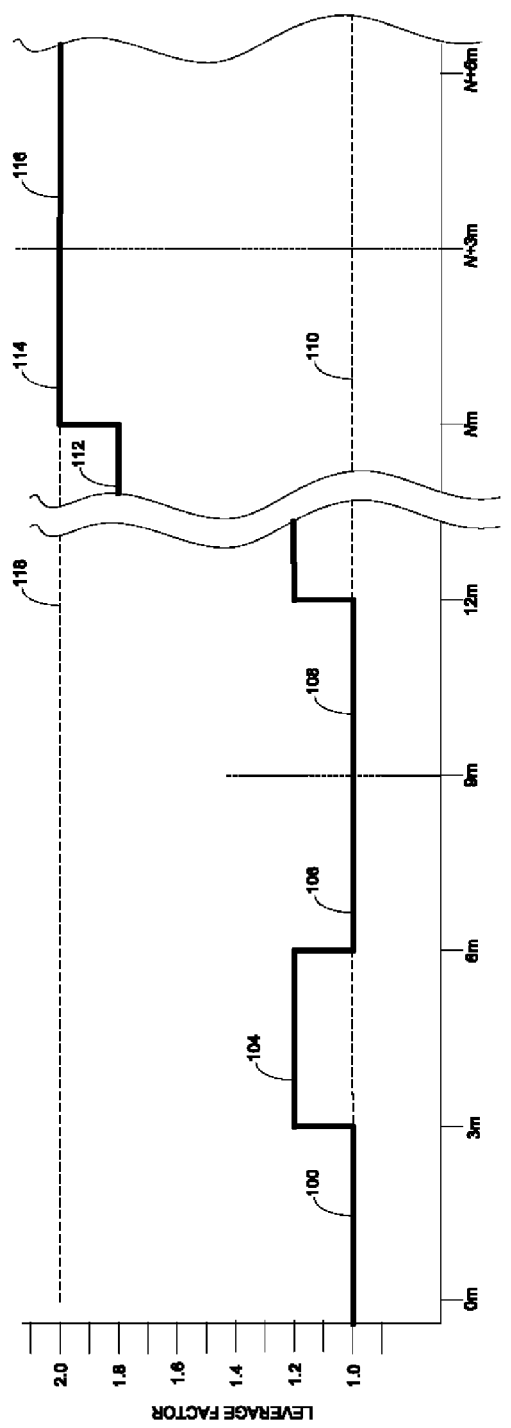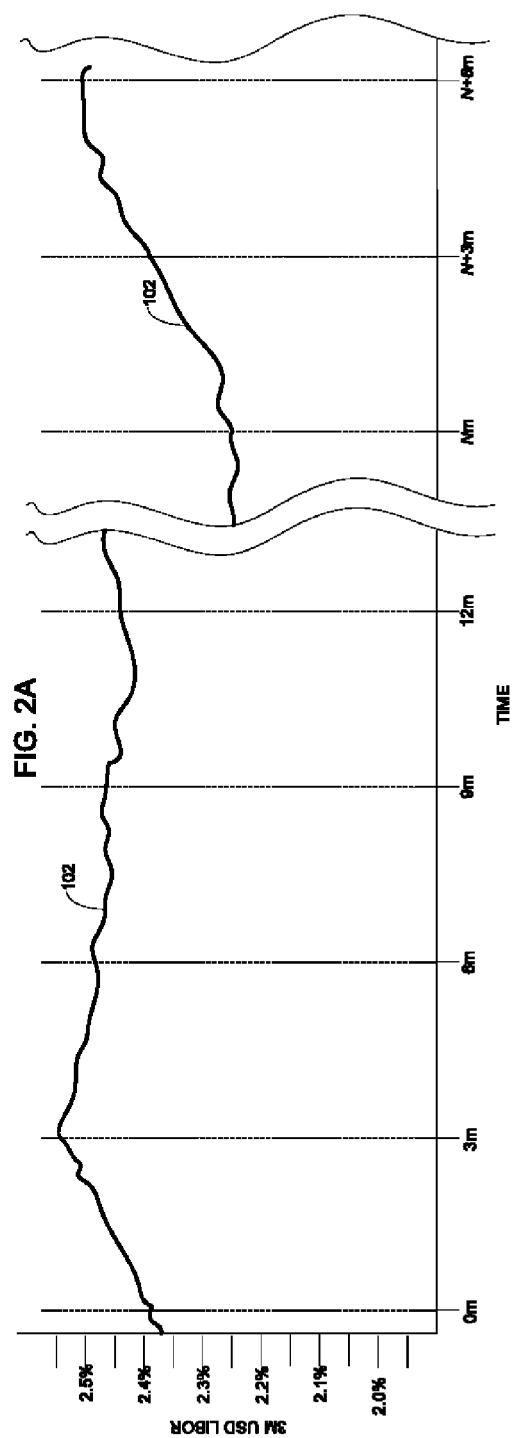
FIG. 2A
FIG. 2B

SYSTEM AND METHOD FOR CALCULATING A FINANCIAL MARKET INDEX

BACKGROUND

Bond Market Association (BMA) swaps are a common debt management tool. A BMA swap is an interest rate exchange in which the parties agree to trade interest payments on debt obligations. Generally, one party pays a fixed interest rate and receives floating-rate interest payments based on the BMA's floating-rate municipal swap index. The other party to the swap receives fixed interest payments and pays the floating rate. In some cases, these swaps are used by investors for hedging.

The Securities Industry and Financial Markets Association (SIFMA) Municipal Swap Index, produced by Municipal Market Data (MMD), is a 7-day high-grade market index comprised of tax-exempt Variable Rate Demand Obligations (VRDOs). As noted above, one of the elements of a swap transaction is the index on which the floating rate is based. The SIFMA Municipal Swap Index commonly serves as the benchmark floating rate in swap transactions.

SUMMARY OF THE INVENTION

In one general aspect, the present invention is directed to computer-based systems and methods of computing a value for a financial market index. In various embodiments, the method may comprise determining a leverage factor based on market data such as the change in an economic indicator, such as the 3M USD LIBOR, over a time period. The leverage factor may be increased when the economic indicator positively increases by a predefined amount over the time period and may be decreased when the economic indicator does not positively increase by the predefined amount over the time period. In one embodiment, the leverage factor is not increased above an upper bound and is not decreased below a lower bound. The index value may be calculated, using a computer system, based on a long position in a first municipal bond swap index and a short position in a second interest rate swap index where the long position is leveraged against the short position based on the leverage factor.

FIGURES

Various embodiments of the present invention are described herein by way of example in conjunction with the following figures wherein:

FIG. 2A is a graph of a leverage factor with respect to time;

FIG. 2B is a graph of an interest rate with respect to time; and

DETAILED DESCRIPTION OF THE INVENTION

Various aspects of the present embodiments are generally directed to computer-implemented systems and methods for determining a financial market index that seeks to exploit the different shape of the Municipal and USD Swap Curve and the historical spread between the BMA resets and reset expectations. In one embodiment, the financial market index seeks to exploit this bias by replicating the performance of a long spot SIFMA Swap position hedged by a short position in a LIBOR Swap.

Figure 1:
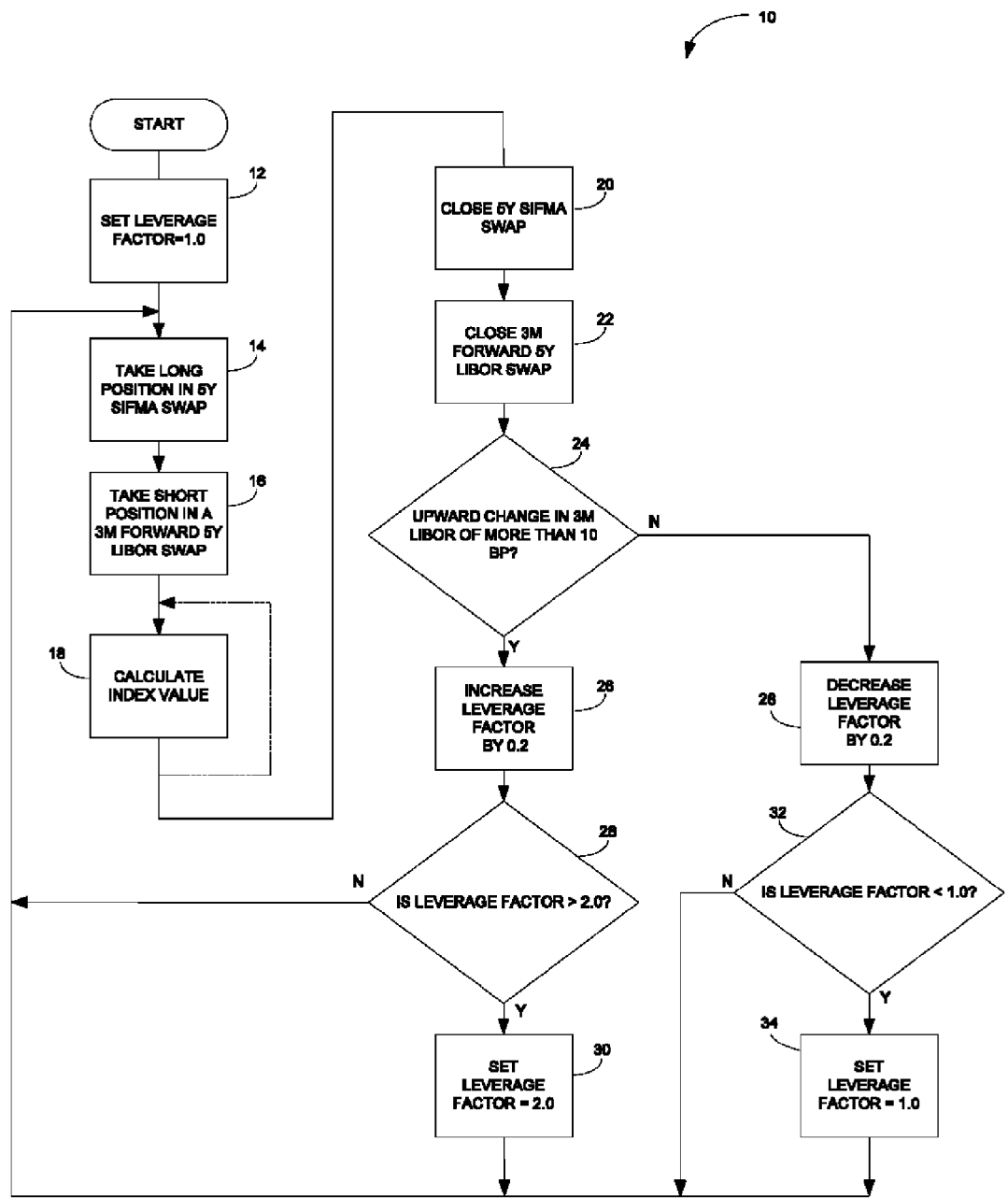
FIG. 1 is a flow chart of a financial market index according to one embodiment of the present invention.

In one embodiment, the index value is based on a long position in a municipal bond swap index, such as the 5Y SIFMA Swap Index, and a short position in an interest swap, such as the 3M Forward 5Y LIBOR Swap Index. The long swap is also leveraged relative to the short swap by a leverage factor. FIG. 1 is a flow chart illustrating a process 10 for computing the index value in accordance with various embodiments of the present invention. The process may be implemented using a computer system, as described further below.

As shown in the illustrated embodiment, the leverage factor is set equal to an initial value of 1.0 at block 12. It is appreciated that other leverage factors may be used to initiate the index, such as 0.5, 1.6 or 2.0, for example. In one embodiment, a long position is taken in a 5Y SIFMA Swap (or some other municipal bond swap) at block 14 and a short position may be taken in a 3M Forward 5Y LIBOR Swap (or some other interest rate swap) at block 16. The position may be actual or synthetic positions. In one embodiment, the notional of the LIBOR Swap is a fraction, such as 55%, of the SIFMA Swap notional. The leverage of the long position against the short position may be determined by the leverage factor. As discussed in more detail below, a value for the index may be calculated at block 18. As may be appreciated, the value may be calculated on a repeating basis, such as daily or weekly. After a time period had passed, such as three months, the two existing swaps may be closed. For example, the 5Y SIFMA Swap may be closed at block 20 and the 3M Forward 5Y LIBOR Swap may be closed at block 22. Before additional positions are taken in the swaps, the leverage factor may be modified based on an economic indicator, such as the change in the 3M USD LIBOR rate.

In the illustrated embodiment, the magnitude and direction of the change in the 3M USD LIBOR rate is analyzed at block 24. In one embodiment, if the 3M LIBOR rate increases by at least 10 basis points (BP) during a particular time period, then the leverage factor may be increased from its preceding value by 0.2 at block 26, otherwise the leverage factor is decreased by 0.2 at 28. For example, if the 3M LIBOR rate on a first index calculation date before the rebalancing date is at least 10 BP higher than the 3 m LIBOR on the first index calculation date before the previous rebalancing date, the leverage is increased, otherwise, the leverage is decreased. It is appreciated, however, that in other embodiments, other metrics or intervals may be used, and that the leverage factor may be increased or decreased by various amounts. For example, in one embodiment, an increase of the 3M LIBOR rate by 5 BP may result in an increase in the leverage factor by 0.3. Similarly, if the LIBOR rate does not increase by at least 5 BP, the leverage factor may be decreased by 0.3.

In the illustrated embodiment, the leverage factor is always kept from exceeding an upper bound of 2.0 and a lower bound of 1.0. For example, if the leverage factor is increased at block 26, then at block 29 it is determined if the magnitude of the leverage factor is greater than 2.0. If it is greater than 2.0, then the leverage factor is set equal to 2.0 at block 30. Similarly, if the leverage factor is decreased at block 28, then at block 32 it is determined if the magnitude of the leverage factor is less than 1.0. If it is less than 10, then the leverage factor is set equal to 1.0 at block 34. For example, if the leverage factor is decreased from 1.0 to 0.8 at block 28, the leverage factor will be set to 1.0 at block 34 in order to keep the leverage factor within the lower bound. It is appreciated that other upper and lower bounds may be used, such as 0.6 and 2.4, respectively. Once the leverage factor has been determined on the rebalance date, a long position in a 5y SIFMA swap may be leveraged with a short position in a 3M Forward 5y LIBOR swap according to the leverage factor. In one embodiment, the notational of the swap is based on the leverage factor.

FIG. 2A shows a graph with the leverage factor in the vertical axis and time in the horizontal axis. As illustrated in this example embodiment, the leverage factor is evaluated, and potentially adjusted, on the rebalance dates (shown quarterly) in response to the changes in the 3M USD LIBOR plot 102 shown in FIG. 2B. As illustrated, the leverage factor at a first period 100 is set to an initial value of 1.0. After three months, the leverage factor is adjusted based on the performance of the 3M USD LIBOR in FIG. 2B. As shown, the 3M USD LIBOR plot 102 has increased by at least 10 BP from a first index calculation date before the rebalancing date to the first index calculation date before the previous rebalancing date. Accordingly, the leverage factor is increased to 1.2 for a second period 104. A third period 106 has a leverage factor of 1.0 since the 3M USD LIBOR plot 102 did not increase by at least 10 BP during the relevant time period. Instead of having a leverage factor of 0.8, the fourth period 108 has a leverage factor of 1.0 due to the lower bound 110. The leverage factor is illustrated as 1.8 in a fifth period 112. The leverage factor is increased to 2.0 in the sixth period 114 in response to the performance of the 3M USD LIBOR in FIG. 2B. The leverage factor in the sixth period 114 is also at 2.0 even though the 3M USD LIBOR in FIG. 2B increased by 10 BP during the relevant period. Therefore, instead of increasing to 2.2, the leverage factor remains at 2.0 due to the upper bound 118.

In one embodiment, on every rebalancing date the index may be reinvested in a Quarterly/Quarterly LIBOR Swap and a Quarterly/Quarterly SIFMA Swap position and all swap payments occur one business day after the 14th of the month in March, June, September, and December. It is appreciated, however, that other dates, timeframes, and investment vehicles may be used.

Figure 3:
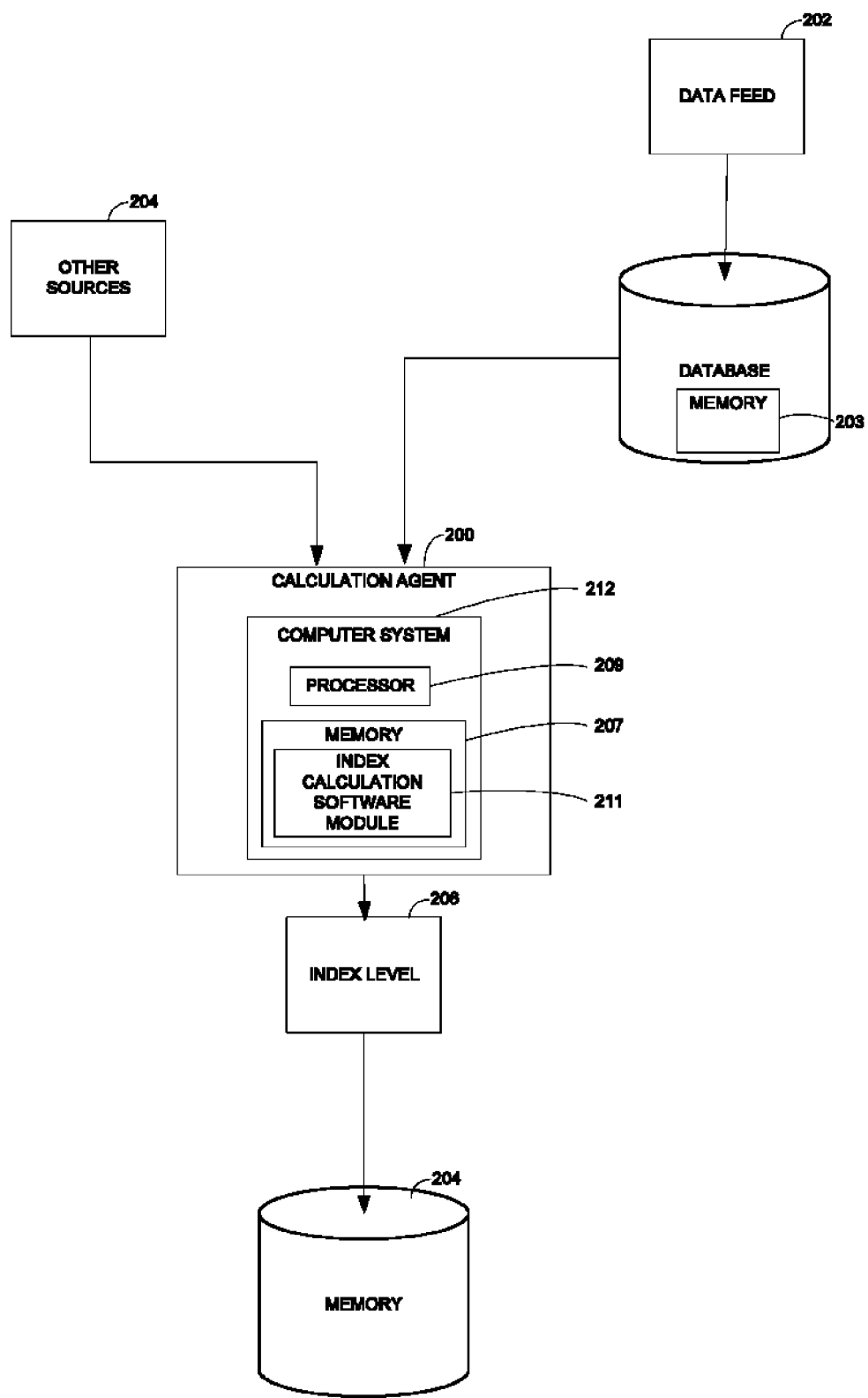
FIG. 3 is a block diagram of a computer system according to various embodiments of the present invention.

As illustrated in FIG. 3, an index level 206 may be calculated by a calculation agent 200 once a day, for example, on each index calculation day using relevant data sources, such as a database 208 that stores information and market data from data feed 202. The data stored in the database 208 may be stored in a non-volatile computer memory 203, such as a hard disk drive, a read only memory (e.g., a ROM IC), or other types of non-volatile memory. Also, the data of the database 208 may be stored on a remote electronic computer system (not shown), for example. In some embodiments, the data feed 202 may supply the calculation agent 200 directly with relevant data, such as LIBOR data. In various embodiments, the calculation agent 200 may receive information from other sources 204. The calculation agent 200 may receive the information through any suitable techniques, such as through a computer network connection or from an optical disk, for example. The calculation agent 200 may utilize a computer system 212 to calculate the daily value for the index. The computer system 212 may be any suitable device or system, such as a personal computer, laptop, server, mainframe, etc. Software with instructions for calculations for the index, such as an index calculation software module 211, may be stored on a computer memory 207 associated with the computer system 212. A processor 209 of the computer system 212 may execute the software to calculate the value for the index. The index calculation software module 211 may comprise computer instructions that, when executed by the processor 209, cause the processor 209 to calculate the index according to the processes described herein. The computer system 212 may comprise one or more processors 209 and one or more computer memories 207. For convenience, only one processor 209 and only one memory 207 are shown in FIG. 3. The processor 209 may be implemented as an integrated circuit (IC) having one or multiple cores. The memory 207 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. The RAM and/or ROM memory units may be implemented as discrete memory ICs, for example.

The calculated index value may be stored in a memory or computer file associated with the computer system 212. The value for the index 106 may be stored in any suitable memory structure, such as computer memory 204. The computer memory 204 may comprise volatile and/or non-volatile memory units. Volatile memory units may comprise random access memory (RAM), for example. Non-volatile memory units may comprise read only memory (ROM), for example, as well as mechanical non-volatile memory systems, such as, for example, a hard disk drive, an optical disk drive, etc. In addition, the calculated index value may be transmitted in a file via a computer to a remote computer device or system. The computer system 212 may transfer the calculated index, such as in a file, to another computer system via an electronic data communication network, such as a LAN or WAN (not shown). Furthermore, the index level 206 may be calculated on any cycle, such as daily, monthly, hourly, or real time. In various implementations, the index level may be calculated and published daily.

The index level may be initiated at a value of 1000, at its base date, or any other suitable value. The index level generally may be determined by the leverage factor of the preceding rebalancing date and the Swap mark to market as calculated by equation (1):

$$\text{Index Level}_t = \text{Index Level}_{Preceding\ Rebalancing\ Level} \quad (1)$$
$$(1 + LF_{Preceding\ Rebalancing\ Date} \cdot \text{Swaps Marked to } Market_t)$$

where:

Index Level$_{Preceding\ Rebalancing\ Date}$ is the Index Level on the Preceding Rebalancing Date; and $LF_{Preceding\ Rebalancing\ Date}$ is the Leverage Factor on the Preceding Rebalancing Date.

Swaps Marked to Market$_t$ may be calculated as the sum of equation (2) (the SIFMA Swap carry), equation (3) (the LIBOR Swap Marked to Market), and equation (4) (the SIFMA Swap Marked to Market):

$$[SIFMASwapRateStrike - AvgBMA_t(PasteEffDate, NextEffDate)]] \quad (2)$$
$$\left[\left(\frac{NextEffDate - PastEffDate}{36525}\right)\left(\frac{1}{1 + 3\ m\ LIBOR\left(\frac{NextEffDate - t}{36000}\right)}\right)\right]$$

$$0.55[LIBORSwapRateStrike - LIBORSwapRate_t(NextEffDate, 20Quaters)] \ldots \cdot LIBORSwapPV01_t(NextEffDate, 20Quarters) \quad (3)$$

$$[SIFMASwapRateStrike - SIFMASwapRate(NextEffDate, 19Quaters)] \ldots \cdot LIBORSwapPV01_t(NextEffDate, 19Quarters) \quad (4)$$

where:

AvgBMA$_t$ may be computed as the effective weighted average of SIFMA resets for the period between PastEffDate and t and the 3M LIBOR multiplied by the 1-year Ratio for the remaining period (t+1 to NextEffDate);

NextEffDate may be set to be two business days after the Next Rebalancing Date, although it is appreciated that other suitable timeframes may be used;

PastEffDate may be set to be two business days after the Preceding Rebalancing Date, although it is appreciated that other suitable timeframes may be used;

LIBORSwapRateStrike may be computed as the rate on the Preceding Rebalance Date of a 3M forward 5y Quarterly/Quarterly swap with each payment date on the first business after them 14th of the month in March, June, September and December. The effective date of the swap is the NextEffDate, and in some embodiments, the number of quarters may be 20;

SIFMASwapRateStrike may be computed as the rate on the Preceding Rebalance Date of a spot 5y Quarterly/Quarterly SIFMA swap with each payment date on the first business after the 14th of the month in March, June, September and December. The effective date of the swap is the PastEffDate, the number of quarters may be 19; and SIFMASwapRate may be computed as of day t as the rate of a Quarterly/Quarterly SIFMA swap effective on date NextEffDate with each payment dates on the first business after the 14th of the month in March, June, September and December.

SIFMASwapRate may be computed in accordance with equation (5):

$$SIFMA\ Swap\ Rate(EffectDate, Nb\ Quarter) = \qquad (5)$$

$$\frac{\left\{\sum_{i=1}^{NbQuarter} Libor(Date_i) \cdot \frac{Fwd\ 3\ mBMARatio(Date_i)}{100} \cdot DF(Date_i) \cdot \frac{Date_i - Date_{i-1}}{36000}\right\}}{\sum_{i=1}^{NbQuarter} Libor(Date_i) \cdot DF(Date_i) \frac{Date_i - Date_{i-1}}{36000}}$$

$$\ldots Libor\ Swap\ Rate(EffectDate, NbQuarter)$$

where:

$$Libor(Date_i) = \left[\frac{DF(Date_{i-1})}{DF(Date_i)} - 1\right] \cdot \frac{360}{Date_i - Date_{i-1}}$$

$Date_0$ is the EffectDate and $Date_i$ is the first business day after the 14th in the month one quarter after $Date_{i-1}$.

$DF(Date_i)$ may be computed via cubic interpolation on the logarithm of the discount curve described below and the Forward 3M BMA Ratios are computed by cubic interpolation of the Forward 3M BMA Ratio Curve described below.

LIBORSwapRate may be computed as of day t as the rate of a Quarterly/Quarterly LIBOR swap effective on date NextEffDate with each payment dates on the first business after the 14th of the month in March, June, September and December.

LIBORSwapRate may be computed in accordance with equation (6):

$$LiborSwapRate(EffectDate, NbQuarter) = \qquad (6)$$

$$\frac{100\{DF(Date_0) - DF(Date_{NbQuarter})\}}{Libor\ Swap\ PV01(EffectDate, Nb\ Quarter)}$$

where:

LIBORSwapPV01 may be computed as of day t as the PV01 of a Quarterly/Quarterly LIBOR swap effective on date NextEffDate with each payment dates on the first business after the 14th of the month in March, June, September and December.

LIBORSwapPV01 may be determined in accordance with equation (7):

$$LiborSwapPV01(EffectDate, Nb\ Quarter) = \qquad (7)$$

$$\sum_{i=1}^{NbQuarter} DF(Date_i) \frac{Date_i - Date_{i-1}}{365.25}$$

In one embodiment, for any day $T_0$, a curve of sixty-two (62) discount factors (DF) may be built. The dates corresponding to those discount factors may be distributed as follows:

$T_1$: two business days after $T_0$;
$T_2$: 3 months after $T_1$; and
$T_3$ to $T_{62}$ may correspond to the consecutive payment dates of the fixed leg of a 30 Year semi-annual LIBOR swap traded on date $T_0$.

For example, $DF(T_1)$ may be calculated in accordance with equation (8):

$$DF(T_1) = \frac{1}{1 + OvernightLibor \cdot \frac{T_1 - T_0}{36000}} \qquad (8)$$

$DF(T_2)$ may be calculated in accordance with equation (9):

$$DF(T_2) = DF(T_1) \frac{1}{1 + 3mLibor \cdot \frac{T_2 - T_1}{36000}} \qquad (9)$$

$DF(T_3)$ may be calculated in accordance with equation (10):

$$DF(T_3) = DF(T_2) \frac{1}{1 + 3 \times 6FRA \cdot \frac{T_3 - T_2}{36000}} \qquad (10)$$

In various embodiments, $DF(T_4) \ldots, DF(T_{62})$ may be computed recursively in accordance with equation 11:

$$DF(T_i) = \frac{[100 * DF(T_1)] - Swap(T_i) \sum_{j=1}^{i-1} DF(T_j) \cdot \frac{T_j - T_{j-1}}{36525}}{100 + Swap(T_i) \cdot \frac{T_i - T_{i-1}}{36525}} \qquad (11)$$

where:

Swap(Ti) is computed via cubic interpolation between the 1, 2, 3, 4, 5, 6, 7, 8, 9, 10, 15, 20, and 30 year swap rates respectively corresponding to dates ($T_4, T_6, T_8, T_{10}, T_{12}, T_{14}, T_{16}, T_{18}, T_{20}, T_{22}, T_{32}, T_{42}, T_{62}$).

On any day $T_o$ a curve of 120 3M Forward BMA Ratios may be built. The dates corresponding to those ratios ($T'_2$ to $T'_{121}$) may correspond to the payment dates of the floating leg of a 30 Year LIBOR swap traded on date $T_0$. $T'_1$ may be set to be two business days after $T_0$. $T'_2$ thorough $T'_5$ may be calculated in accordance with equation (12)-(15):

$$\text{Fwd}3m\text{BMARatio}(T'_2) = 1 \text{ yearRatio} \quad (12)$$

$$\text{Fwd}3m\text{BMARatio}(T'_3) = 1 \text{ yearRatio} \quad (13)$$

$$\text{Fwd}3m\text{BMARatio}(T'_4) = 1 \text{ yearRatio} \quad (14)$$

$$\text{Fwd}3m\text{BMARatio}(T'_5) = 1 \text{ yearRatio} \quad (15)$$

Subsequently, the 3M BMA Forward Ratio for date $T_6 \ldots T_{121}$ may be computed recursively in accordance with equation (16):

$$Fwd3mBMARatio(T'_i) = \\ \cdots \frac{\frac{RATIO(T'_i)}{100} \sum_{T'_j=T'_2}^{T'_1} Libor(T'_j) \cdot DF(T'_j) \frac{T'_j - T'_{j-1}}{36000} - \frac{RATIO(T'_{i-1})}{100}}{Libor(T'_i) \cdot DF(T'_i) \cdot \frac{T'_i - T'_{i-1}}{36000}} \\ \cdots \sum_{T'_j=T'_2}^{T'_{i-1}} Libor(T'_j) \cdot DF(T'_j) \frac{T'_j - T'_{j-1}}{36000} \quad (16)$$

where:
LIBOR($T'_i$) may be computed recursively in accordance with equation (17):

$$Libor(T'_i) = \left[\frac{DF(T'_{i-1})}{DF(T'_i)} - 1\right] \cdot \frac{360}{T'_i - T'_{i-1}} \quad (17)$$

Ratio($T'_i$) may be computed by cubic interpolation between the 1, 2, 3, 4, 5, 7, 10, 15, 20, and 30 year Ratio, respectively, corresponding to dates ($T'_5$, $T'_5$, $T'_{13}$, $T'_{17}$, $T'_{21}$, $T'_{29}$, $T'_{41}$, $T'_{61}$, $T'_{81}$, $T'_{121}$).

DF($T'_i$) may be computed by cubic interpolation of the logarithm of the discount curve described above.

The average BMA may be calculated in accordance with equation 18:

$$AvgBMA(t, PastEffDate, NextEffDate) = \quad (18)$$

$$\frac{\sum_{\tau=PastEffDate}^{t} [SIFMA_{\tau-7}\{I_{MTW}(\tau) + I_{TH}(\tau)\} + SIFMA_{\tau}\{I_{FSS}(\tau) + I_{TNH}(\tau)\}] + 3 \, mLibor}{NextEffDate - PastEffDate}$$

$$\cdots \times \frac{Ratio(1y)}{100} * (NextEffDate - t - 1)$$

where:
$SIFMA_\tau$ is the SIFMA reset in the week of day $\tau$;
$I_{MTW}(\tau)$ is 1 if $\tau$ is a Monday or Tuesday or Wednesday and 0 otherwise;
$I_{FSS}(\tau)$ is 1 if $\tau$ is a Friday or Saturday or Sunday and 0 otherwise;
$I_{TH}(\tau)$ is 1 if $\tau$ is a Thursday and a New York Holiday and 0 otherwise; and
$I_{TNH}(\tau)$ is 1 if $\tau$ is a Thursday and a New York Business Day and 0 otherwise.

Various sources or techniques may be used to obtain market data. For example, some of the necessary data may be received via data feeds or data services that transmit data electronically over computer networks.

In one embodiment, the PREB13 Page from the Bloomberg data service ("Bloomberg") serves as a ratio source. As may be appreciated, other data services may be used, such as Reuters. The ISDAFIX may be used a benchmark for fixed rates on interest rate swaps. In one embodiment, Bloomberg serves as the primary source for the 1y SWAP ISDAFIX, the 2y SWAP ISDAFIX, the 3y SWAP ISDAFIX, the 4y SWAP ISDAFIX, the 5y SWAP ISDAFIX, the 6y SWAP ISDAFIX, the 7y SWAP ISDAFIX, the 8y SWAP ISDAFIX, the 9y SWAP ISDAFIX, the 10y SWAP ISDAFIX, the 15y SWAP ISDAFIX, the 20y SWAP ISDAFIX, and the 30y SWAP. In one embodiment, Bloomberg serves as a source for the USD 3M LIBOR, the USD Overnight LIBOR, the USD 3×6 FRA, and the SIFMA Index. As may be appreciated, other forms of source of market data may be used.

In various embodiments, an issuer may issue a note to investors where payments due on the note are related to or based on the index value. The payments may be, for example, periodic payments that are due during the term of the note and/or a payment that is due at maturity of the note. The note may be, for example, a structured note or an index-linked note. The payments on the notes may be calculated by a computer system (such as the computer system shown in FIG. 3) using market data and data regarding the issued notes. The data regarding the issued notes may comprise the CUSIP, the owner, the issuer, the payout function, etc., and may be stored in a database. For example, the performance of a structured note might be tied to the index with the structured note paying out periodically during the term of the note a multiple of the index value. In one embodiment, an index-linked note is associated with the index with the formula for the payout related to the index.

While several embodiments of the invention have been described, it should be apparent, however, that various modifications, alterations and adaptations to those embodiments may occur to persons skilled in the art with the attainment of some or all of the advantages of the invention. For example, the steps of the processes described above may be performed in different or alternative orders in various embodiments, or certain steps could be combined. It is therefore intended to cover all such modifications, alterations and adaptations without departing from the scope and spirit of the present invention as defined by the appended claims.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

What is claimed is:

1. A computer-implemented method for computing a value for a financial market index, the method comprising:

storing market data in a computer database, wherein the market data comprises interest rate data and swap rate data;

determining, by a computer system that is in communication with the computer database, a leverage factor based on the market data, wherein the computer system comprises a processor circuit and a memory circuit, wherein the leverage factor is determined by:

determining a change of an economic indicator during a time period, wherein the leverage factor is increased from a preceding value when the economic indicator positively increases by a predefined amount or more during the time period, wherein the leverage factor is decreased from the preceding value when the economic indicator does not positively increase by the predefined amount or more during the time period, and wherein the leverage factor is not increased above an upper bound, wherein the leverage factor is not decreased below a lower bound;

calculating, by the computer system, an index value for the index based on a long position in a first municipal bond swap index and a short position in a second interest rate swap index and based on the market data, wherein the long position is leveraged against the short position based on the leverage level; and storing the calculated index value in a computer memory of the computer system.

2. The method of claim 1, wherein the upper bound is 2.0.

3. The method of claim 2, wherein the lower bound is 1.0.

4. The method of claim 3, wherein the first municipal bond swap index is a 5y SIFMA Swap, wherein the second interest rate swap index is a 3M forward 5y LIBOR swap, and wherein the economic indicator is the 3M USD LIBOR.

5. The method of claim 1, wherein the first municipal bond swap index is a 5y SIFMA Swap.

6. The method of claim 5, wherein the second interest rate swap index is a 3M forward 5y LIBOR swap.

7. The method of claim 1, wherein the economic indicator is the 3M USD LIBOR.

8. The method of claim 1, wherein the leverage factor is determined quarterly.

9. The method of claim 1, wherein the index value is calculated daily.

10. The method of claim 9, wherein the index value is determined based on the equation:

$$\text{Index Level}_t = \text{Index Level}_{Preceding\ Rebalancing\ Level}(1 + LF_{Preceding\ Rebalancing\ Date} \cdot \text{Swaps Marked to Market}_t)$$

where

Index Level$_{Preceding\ Rebalancing\ Date}$ is the index value on a preceding rebalancing date;

$LF_{Preceding\ Rebalancing\ Date}$ is the leverage factor on the preceding rebalancing date; and Swaps Marked to Market$_t$ is related to the sum of a SIFMA Swap carry, a LIBOR Swap Marked to Market, and a SIFMA Swap Marked to Market.

11. The method of claim 1, further comprising determining by the computer system the payout of a structured note whose payout is based on the index value.

12. A system for computing a value for a financial market index, the system comprising:

a processor; and a database that stores market data in communication with the processor, wherein the market data comprises interest rate data and municipal swap rate data, wherein the processor is programmed to calculate a value for the financial market index calculated by:
- determining a leverage factor by determining a change of an economic indicator during a time period, wherein the leverage factor is increased from a preceding value when the economic indicator positively increases by an predefined amount during the time period, wherein the leverage factor is decreased from the preceding value when the economic indicator does not positively increase by the predefined amount during the time period, wherein the leverage factor is not increased above an upper bound, wherein the leverage factor is not decreased below a lower bound;
- calculating the index value for the index based on a long position in a first municipal bond swap index and a short position in a second interest rate swap index and based on the market data, wherein the long position is leveraged against the short position based on the leverage level.

13. The system of claim 12, wherein the upper bound is 2.0 and the lower bound is 1.0.

14. The system of claim 13, wherein the first municipal bond swap index is a 5y SIFMA Swap, wherein the second interest rate swap index is a 3M forward 5y LIBOR swap, and wherein the economic indicator is the 3M USD LIBOR.

15. The system of claim 12, wherein the first municipal bond swap index is a 5y SIFMA Swap and wherein the second interest rate swap index is a 3M forward 5y LIBOR swap.

16. The system of claim 12, wherein the economic indicator is the 3M USD LIBOR.

17. The system of claim 12, wherein the leverage factor is determined quarterly.

18. The system of claim 12, wherein the index value is calculated daily.

19. A method comprising:
- issuing notes whose performance is linked to a financial market index;
- storing data regarding the notes in a first computer database;
- storing market data in a second computer database, wherein the market data comprises interest rate data and swap rate data; and
- computing, by a computer system in communication with the first and second databases, payments due on the notes, wherein computing the payments due on the notes comprises computing a value for the financial market index, wherein the computer system comprises a processor circuit and a memory circuit, wherein the value for the financial market index is calculated by:
  - determining a leverage factor based on the market data, wherein the leverage factor is determined by:
    - determining a change of an economic indicator during a time period, wherein the leverage factor is increased from a preceding value when the economic indicator positively increases by a predefined amount or more during the time period, wherein the leverage factor is decreased from the preceding value when the economic indicator does not positively increase by the predefined amount or more during the time period, and wherein the leverage factor is not increased above an upper bound, wherein the leverage factor is not decreased below a lower bound; and
  - calculating an index value for the index based on a long position in a first municipal bond swap index and a short position in a second interest rate swap index and based on the market data, wherein the long position is leveraged against the short position based on the leverage level.

20. The system of claim 19, wherein the index value is determined based on the equation $$\text{Index Level}_t = \text{Index Level}_{Preceding\ Rebalancing\ Level}(1 + LF_{Preceding\ Rebalancing\ Date} \cdot \text{Swaps Marked to } Market_t)$$

where

Index Level$_{Preceding\ Rebalancing\ Date}$ is the index level on the preceding rebalancing date;

$LF_{Preceding\ Rebalancing\ Date}$ is the leverage factor on the preceding rebalancing date;

Swaps Marked to Market$_t$ is the sum of a SIFMA Swap carry, a LIBOR Swap Marked to Market, and a SIFMA Swap Marked to Market.

* * * * *